United States Patent
Sasaki et al.

(10) Patent No.: US 7,202,581 B2
(45) Date of Patent: Apr. 10, 2007

(54) ELECTRIC COMPRESSOR MOTOR HAVING A STATOR CORE OF REDUCED HEIGHT

(75) Inventors: Kenji Sasaki, Sakai-gun (JP); Osaaki Morino, Takefu (JP); Akihiko Yamazaki, Takefu (JP); Yasutake Seki, Sabae (JP); Takakatsu Hatae, Takefu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/519,362

(22) PCT Filed: Jun. 25, 2003

(86) PCT No.: PCT/JP03/08060

§ 371 (c)(1),
(2), (4) Date: Dec. 28, 2004

(87) PCT Pub. No.: WO2004/004093

PCT Pub. Date: Jan. 8, 2004

(65) Prior Publication Data

US 2005/0231050 A1    Oct. 20, 2005

(30) Foreign Application Priority Data

Jul. 1, 2002    (JP) ............................. 2002-191886

(51) Int. Cl.
*H02K 11/00*    (2006.01)
*H02K 5/22*    (2006.01)
(52) U.S. Cl. ....................................................... 310/71
(58) Field of Classification Search ................... 310/71
See application file for complete search history.

(56) References Cited

U.S. PATENT DOCUMENTS 3,979,615 A * 9/1976 Neff ............................. 310/71
3,984,712 A * 10/1976 Hill ............................... 310/71
4,233,534 A * 11/1980 Tharman ..................... 310/71

(Continued)

FOREIGN PATENT DOCUMENTS

EP    1 115 191        7/2001
FR    2573584 A1 *    5/1986
JP    51-103294        9/1976

(Continued)

*Primary Examiner*—Darren Schuberg
*Assistant Examiner*—Ondria Garner
(74) *Attorney, Agent, or Firm*—Steptoe & Johnson LLP (57) ABSTRACT

A stator (1) is configured so that a plurality of power supply terminals (4) each having a tab (4a) of a planar protrusion are located on an end face of a stator core (2), the power supply side end of the winding (3) is connected to the power supply terminal (4), and a lead wire (7) with a flag type terminal (14) is connected to the power supply terminal (4), the lead wire being connected to the flag type terminal (14) in a direction intersecting a press-fitting direction into the tab (4a), the plurality of power supply terminals (4) are arranged at the same height from the end face of the stator core (2) and are inclined so that the faces of the tabs (4a) of the plurality of power supply terminals (4) are not arranged on the same plane. The flag type terminal (14) and the lead wire (7) are prevented from interfering with each other in the vicinity of the power supply terminal (4), and the lead wire (7) is arranged not higher than the flag type terminal (14) from the stator core (2), whereby the overall height of the stator is reduced.

8 Claims, 12 Drawing Sheets

U.S. PATENT DOCUMENTS

| | | | |
|---|---|---|---|
| 4,689,023 A | 8/1987 | Strong et al. | 439/189 |
| 4,694,560 A | 9/1987 | Barrera | 29/564.1 |
| 5,877,567 A | 3/1999 | Moritan | 310/67 R |
| 6,091,172 A | 7/2000 | Kakinuma et al. | 310/71 |
| 2003/0020344 A1 | 1/2003 | Futami et al. | 310/71 |

FOREIGN PATENT DOCUMENTS

| | | |
|---|---|---|
| JP | 55-125050 | 9/1980 |
| JP | 63-121441 | 5/1988 |
| JP | 63121441 A * | 5/1988 |
| JP | 3-203550 | 9/1991 |
| JP | 4-265646 | 9/1992 |
| JP | 8-266000 | 10/1996 |
| JP | 2003-134716 | 5/2003 |

* cited by examiner

ELECTRIC COMPRESSOR MOTOR HAVING A STATOR CORE OF REDUCED HEIGHT

TECHNICAL FIELD

The present invention relates to a motor which is used for an electric compressor used for a refrigeration air conditioner and in other general industries.

BACKGROUND ART

Figure 16:
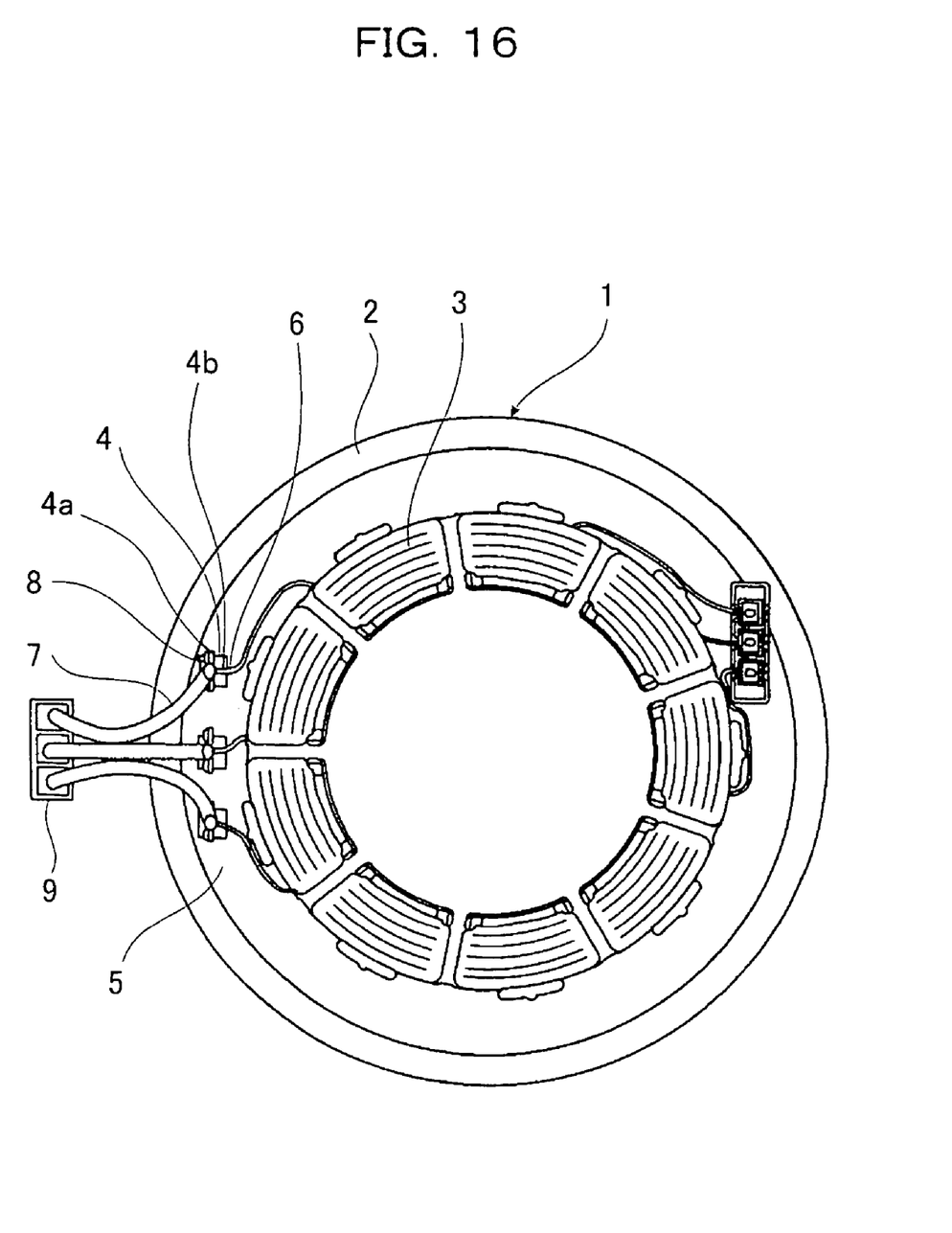
FIG. 16 is a front view of a stator of a conventional motor.
Figure 17:
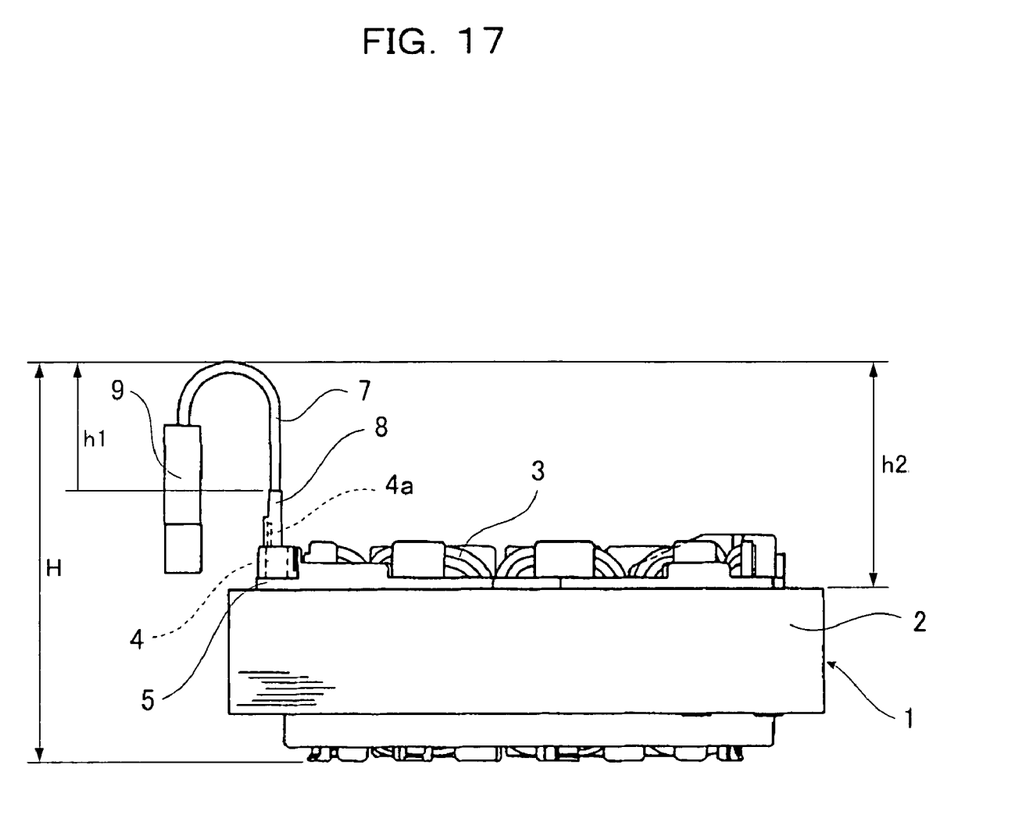
FIG. 17 is a side view of the stator of the conventional example.

As shown in FIGS. 16 and 17, conventionally in such a motor, an end 6 of a winding 3, which is wound in a stator core 2 of a stator 1, and a lead wire 7 are connected to each other via a power supply terminal 4 and a sleeve terminal 8.

To be specific, in FIG. 16, the power supply terminal 4 is fixed on an insulating end plate 5 provided on the stator core 2 in such a way that the face of a tab 4a of the power supply terminal 4 is positioned on a vertical plane of the end face of the stator core 2.

The end 6 of the winding 3 is press-fitted to a slit 4b of the power supply terminal 4. This press fitting exfoliates an insulating coating on the end 6 of the winding 3 and electrical continuity is provided between the winding 3 and the power supply terminal 4.

The sleeve terminal 8 is caulked at one end of the lead wire 7 so as to arrange the lead wire 7 in the same direction as the insertion of the tab, and the other end of the lead wire 7 is connected to a cluster 9. The lead wire 7 is connected to the winding 3 by inserting the sleeve terminal 8 into the tab 4a. The cluster 9 is connected to a power supply.

When the stator 1 is thus connected to a field power supply, the lead wire 7 vertically rises by a length h1 from the sleeve terminal 8 as shown in FIG. 17, thereby increasing an overall height H of the stator 1. A device where the motor is mounted requires a space of h2 from the end face of the mounted stator 1.

It is an object of the present invention to provide a motor which can reduce the overall height H of the stator when the lead wire 7 is connected to the tab 4a.

DISCLOSURE OF THE INVENTION

In order to attain the object, in the present invention, a plurality of power supply terminals are arranged at the same height from an end face of a stator core, the surfaces of tabs are arranged perpendicularly to the end face of the stator core, and the tab faces of the plurality of power supply terminals are not arranged on the same plane. Thus, it is possible to prevent a flag type terminal and a lead wire from interfering with each other in the vicinity of the power supply terminal, and arrange the lead wire not higher than the flag type terminal from the stator core. Thereby the overall height of the stator can be reduced.

A motor of the present invention comprises a stator having windings wound in the stator core and a rotor rotationally supported so as to face the internal cylindrical surface of the stator core. The stator is configured so that the plurality of power supply terminals each having a tab of a planar protrusion are located on an end face of the stator core, the power supply side end of the winding is connected to the power supply terminal, and the lead wire having the flag type terminal attached thereto is connected to the power supply terminal, the lead wire being connected to the flag type terminal in a direction intersecting a press-fitting direction into the tab, wherein the plurality of power supply terminals are arranged at the same height from the end face of the stator core and are inclined so that the tab faces of the plurality of power supply terminals are not arranged on the same plane. Thus, it is possible to prevent the flag type terminal and the lead wire from interfering with each other in the vicinity of the power supply terminal and to arrange the lead wire not higher than the flag type terminal from the stator core. Thereby, the overall height of the stator can be reduced.

When the plurality of power supply terminals are arranged on the same circle, it is possible to arrange the plurality of power supply terminals while rotating the stator core with the central point of the circle serving as an axis, thereby readily fabricating a facility where the power supply terminals are arranged and introducing automation.

In the case where the lead wire is drawn from the end face where the power supply terminals are arranged to the opposite end face through adjacent teeth of a plurality of teeth which stretch toward the internal diameter cylindrical surface of the stator core in a radius direction, even when the lead wire has to be connected from the end face where the power supply terminals are arranged but it is difficult to connect the lead wire due to the presence of other components, the lead wire can be drawn from the end face opposite to the end face where the power supply terminals are arranged and the lead wire can be connected to the power supply.

A first insulating end plate and a second insulating end plate for insulating the stator core and the windings are located on both end faces of the stator core, and power supply terminal holding portions for holding the power supply terminals are located on the first insulating end plate. In this case, the position of the power supply terminal holding portion can be fixed with ease by fixing the insulating end plate to the stator core.

In the case where the first insulating end plate has a pillar and the lead wire is fixed on the pillar, the vibration of the lead wire due to a vibration in the operation of the motor does not propagate through the flag type terminal, thereby preventing a break caused by a fatigue failure of the lead wire.

In the case where the second insulating end plate has a pillar and the lead wire is fixed on the pillar, the vibration of the lead wire due to a vibration in the operation of the motor does not propagate through the flag type terminal, thereby preventing a break caused by a fatigue failure of the lead wire.

In the case where the first insulating end plate has a plurality of walls arranged zigzag and the lead wire is fixed through the walls, the vibration of the lead wire due to a vibration in the operation of the motor does not propagate through the flag type terminal, thereby preventing a break caused by a fatigue failure of the lead wire.

In the case where the second insulating end plate has a plurality of walls arranged zigzag and the lead wire is fixed through the walls, the vibration of the lead wire due to a vibration in the operation of the motor does not propagate through the flag type terminal, thereby preventing a break caused by a fatigue failure of the lead wire.

A power supply cover is provided which is made of a nonconductive material and covers the flag type terminal, thereby preventing an operator from receiving an electric shock during energization.

In the case where the first insulating end plate has a protrusion for holding the power supply cover and the power supply cover has a hole for engagement with the protrusion, it is possible to prevent the power supply cover from being disengaged by the vibration of the motor.

In the case where the windings are concentrated windings which are wound around the teeth stretched toward the internal diameter cylindrical surface of the stator core in the radius direction, it is possible to reduce the overall height of the stator including the windings as well as the power supply.

BEST MODE FOR CARRYING OUT THE INVENTION

Referring to FIGS. 1 to 15, embodiments of the present invention will be described below.

The same configurations as the conventional art will be indicated by the same reference numerals and the detailed explanation thereof is omitted. Since a rotor is similar in configuration to those of ordinary motors, the explanation thereof is also omitted.

(Embodiment 1)

The following explanation will be made in accordance with FIGS. 1 and 2.

Figure 1:
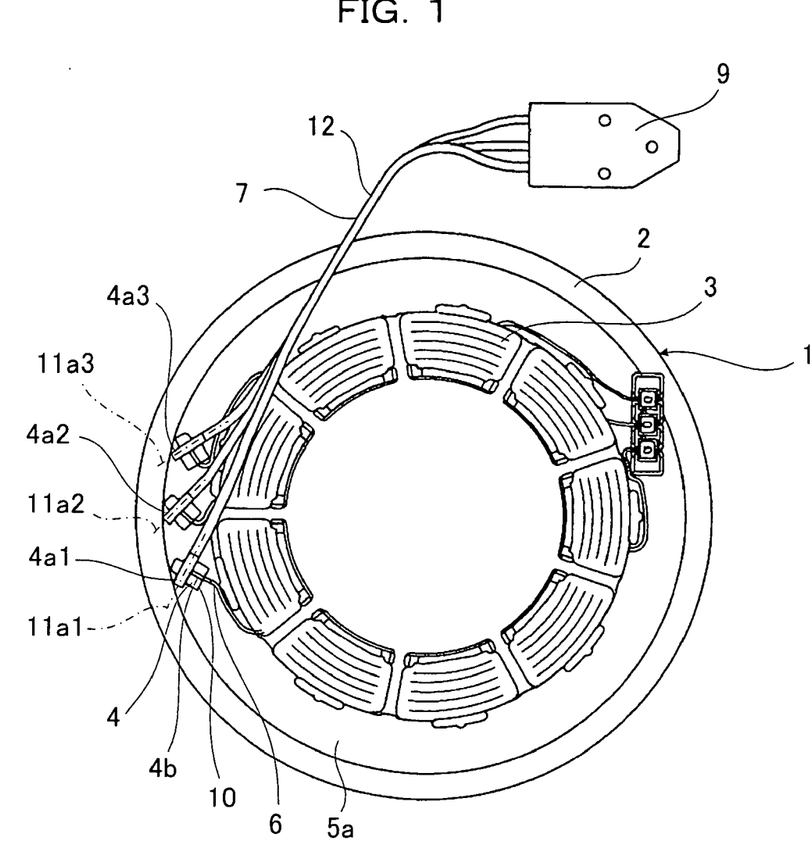
FIG. 1 is a front view of a stator of a motor according to (Embodiment 1) of the present invention.

FIG. 1 is a front view showing a stator of a motor according to (Embodiment 1) of the present invention. In FIG. 1, reference numeral 1 denotes a stator and reference numeral 2 denotes a stator core. Windings 3 are wound in the stator core 2. A plurality of power supply terminals 4 on the stator core 2 are held by a plurality of power supply terminal holding portions 10 which are provided on an insulating end plate 5a.

Since the power supply terminal holding portions 10 are provided on the insulating end plate 5a, the positions of the power supply terminal holding portions 10 can be fixed with ease by fixing the stator core 2 in a process of arranging the power supply terminals 4, so that the power supply terminals 4 can be arranged with stable quality.

A power supply side end 6 of the winding 3 is press-fitted to a slit 4b of the power supply terminal 4, so that an insulating coating on the winding is exfoliated and electrical continuity is provided between the winding 3 and the power supply terminal 4. The power supply terminal 4 has a tab 4a whose face is perpendicular to the end face of the stator core 2 in a state in which the power supply terminal 4 is held on the stator core 2.

Faces 4a1, 4a2, and 4a3 on the tabs 4a of the plurality of power supply terminals 4 are inclined over faces 11a1, 11a2, and 11a3, respectively.

Figure 2:
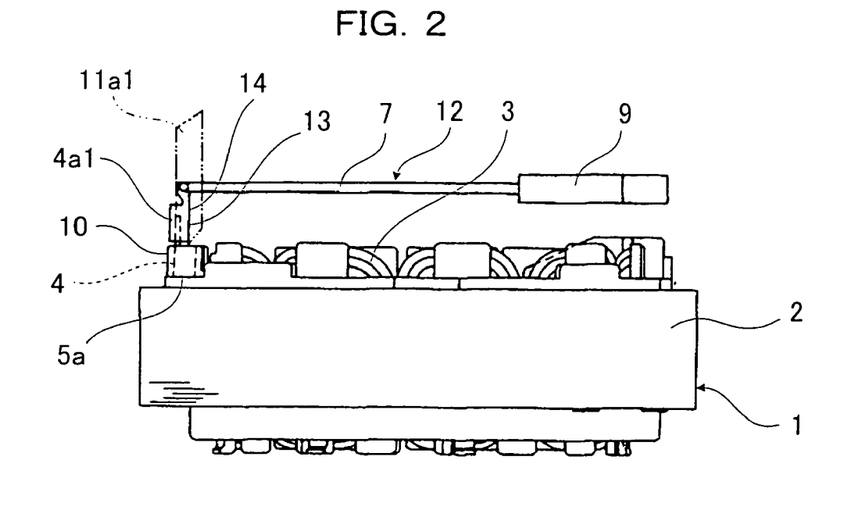
FIG. 2 is a side view of the stator of (Embodiment 1)

FIG. 2 shows a side view.

Reference numeral 12 denotes a lead wire assembly 12, in which a flag type terminal 14 having a face 13 is caulked and connected to an end of the lead wire 7 and the other end of the lead wire 7 is connected to the cluster 9. The face 13, which is inserted to the tab 4a1 of the power supply terminal 4, is perpendicular to the lead wire 7.

The plurality of flag type terminals 14 are inserted to the tabs 4a of the plurality of power supply terminals 4, so that it is possible to connect the windings 3 and the power supply without making contact between the plurality of power supply terminals 4 and the lead wires 7. Further, the plurality of power supply terminals are arranged on the power supply terminal holding portions 10 on the stator core 2 without arranging the faces of the tabs on the same plane. Thus, the lead wire 7 is in parallel with the end face of the stator core 2 on a joint of the lead wire 7 and the flag type terminal and the lead wire 7 can be disposed lower than the flag type terminal 14 relative to the stator core 2 without interference between the flag type terminal 14 and the lead wire 7, thereby reducing the overall height of the stator 1.

(Embodiment 2)

The following explanation will be made in accordance with FIG. 3.

Figure 3:
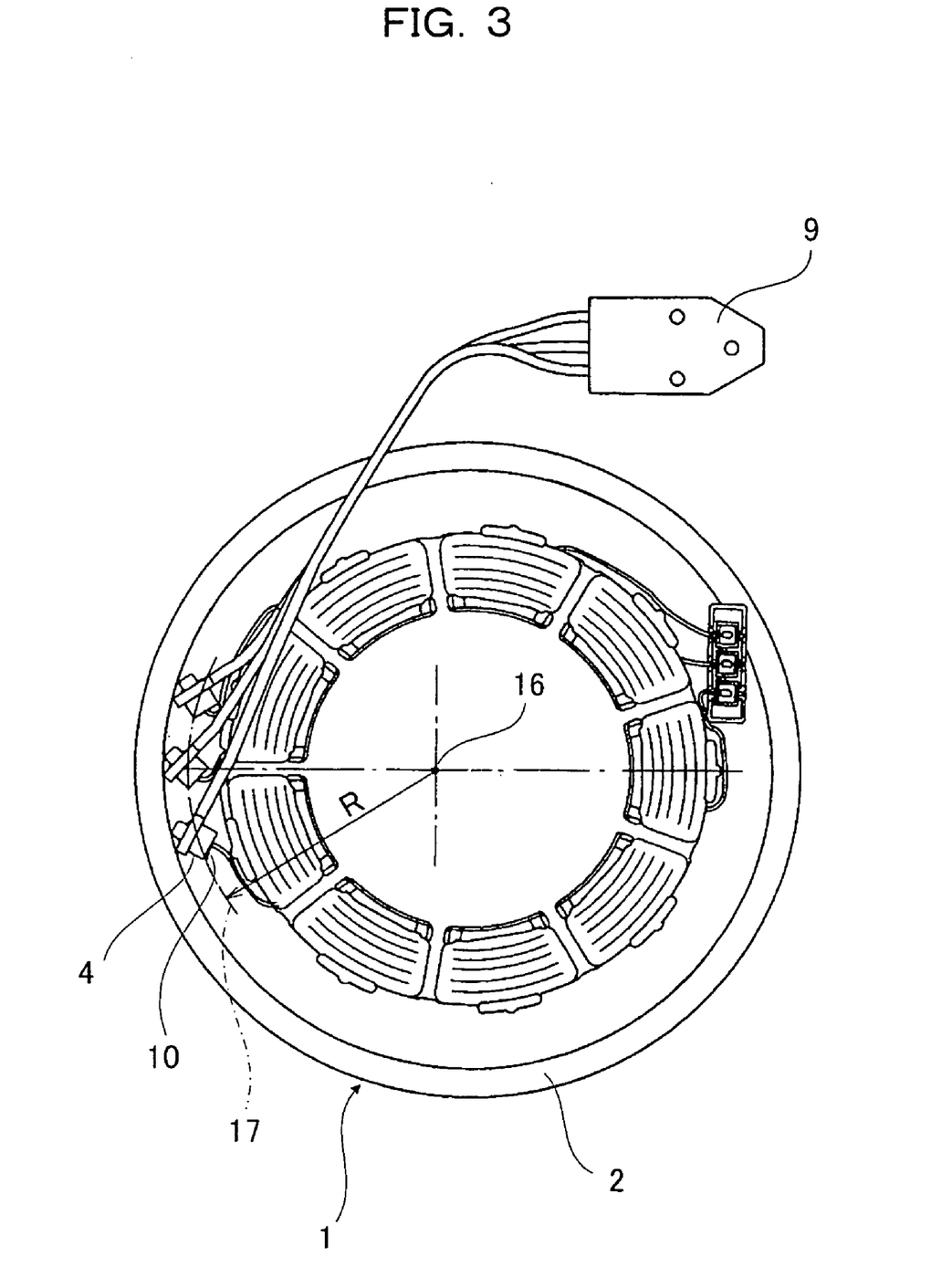
FIG. 3 is a front view of a stator of a motor according to (Embodiment 2) of the present invention.

FIG. 3 is a front view showing a stator of a motor according to (Embodiment 2) of the present invention.

In (Embodiment 2), the plurality of power supply terminals 4 of (Embodiment 1) are positioned on a circle 17 with a constant radius R from a point 16.

Therefore, it is possible to press-fit and fix the plurality of power supply terminals 4 to power supply terminal holding portions 10 while rotating the stator core 2 about the point 16, readily fabricate a facility where the power supply terminals 4 are arranged, and introduce automation.

(Embodiment 3)

The following explanation will be made in accordance with FIGS. 4 and 5.

Figure 4:
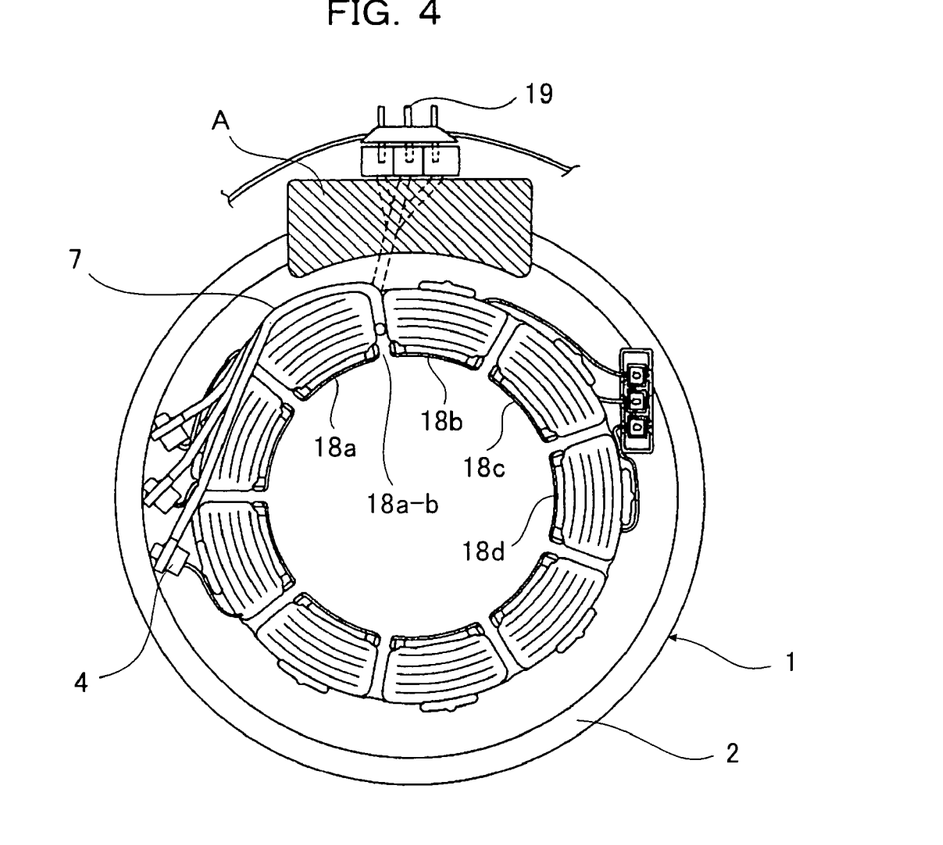
FIG. 4 is a front view of a stator of a motor according to (Embodiment 3) of the present invention.
Figure 5:
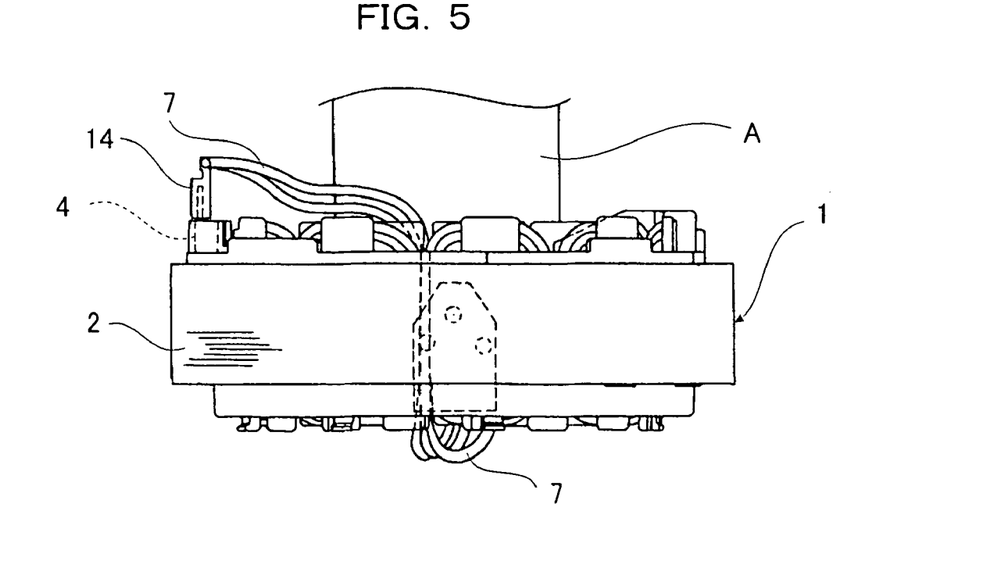
FIG. 5 is a side view of the stator of (Embodiment 3)

FIG. 4 is a front view showing a stator of a motor according to (Embodiment 3) of the present invention. FIG. 5 is a side view.

(Embodiment 3) shows another example of the drawn lead wire 7 of (Embodiment 1) or (Embodiment 2).

The lead wire 7 is drawn from an end face on an insulating end plate 5a, on which power supply terminals 4 are arranged, to an end face on an insulating end plate 5b on the opposite side from the insulating end plate 5a.

To be specific, windings 3 are wound around a plurality of teeth 18a, 18b, 18c, 18d, . . . which stretch toward the internal diameter cylindrical surface of the stator core 2 in the radius direction. The lead wire 7 is drawn through 18a–b between the adjacent teeth 18a and 18b. Even when it is difficult to make connections to a power supply 19 of a device, the lead wire 7 can be connected to the power supply 19 of the device from the end face opposite to the end face where the power supply terminals 4 are arranged.

The lead wire 7 is drawn thus through 18*a*–*b* between the adjacent teeth 18*a* and 18*b*, so that the lead wire 7 is held by the windings wound around the teeth 18*a* and 18*b*, thereby eliminating the need for another component for fixing a midpoint of the lead wire 7.

(Embodiment 4)

The following explanation will be made in accordance with FIG. 6.

Figure 6:
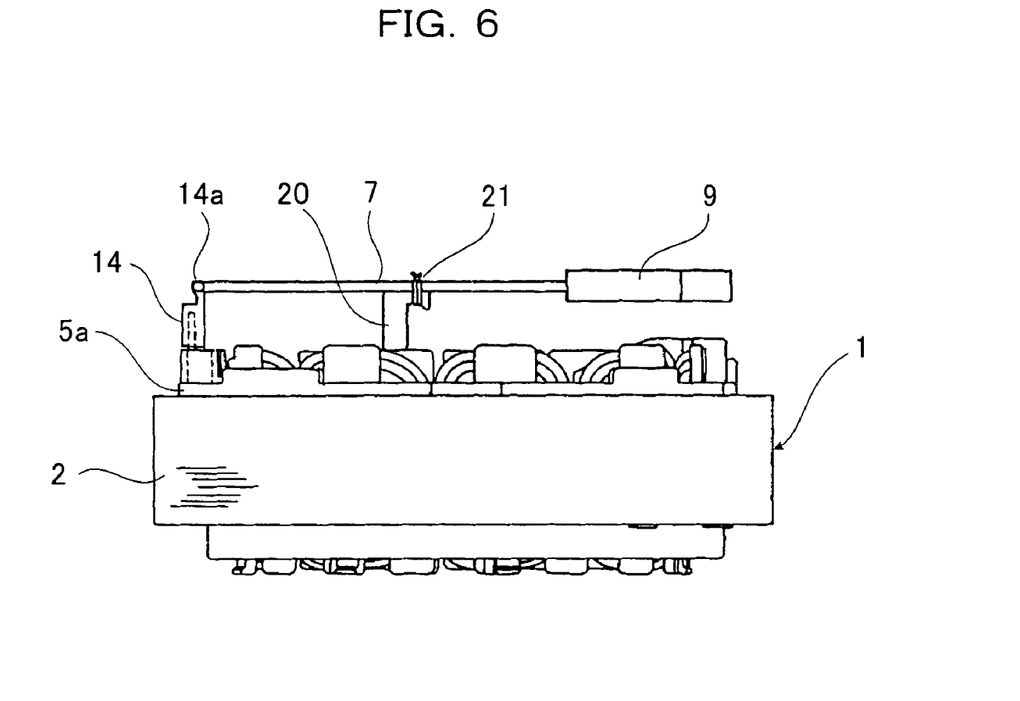
FIG. 6 is a side view of a stator of a motor according to (Embodiment 4) of the present invention.

FIG. 6 is a side view showing a stator of a motor according to (Embodiment 4) of the present invention.

Reference numeral 20 denotes a pillar provided on an insulating end plate 5*a*. The pillar 20 and a lead wire 7 are fixed by a string 21, so that the vibration of the lead wire 7 does not propagate through a caulked portion 14*a* of a flag type terminal 14 during the operation of the motor, thereby preventing a break caused by a fatigue failure of the lead wire 7 on the caulked portion 14*a*.

(Embodiment 5)

The following explanation will be made in accordance with FIG. 7.

Figure 7:
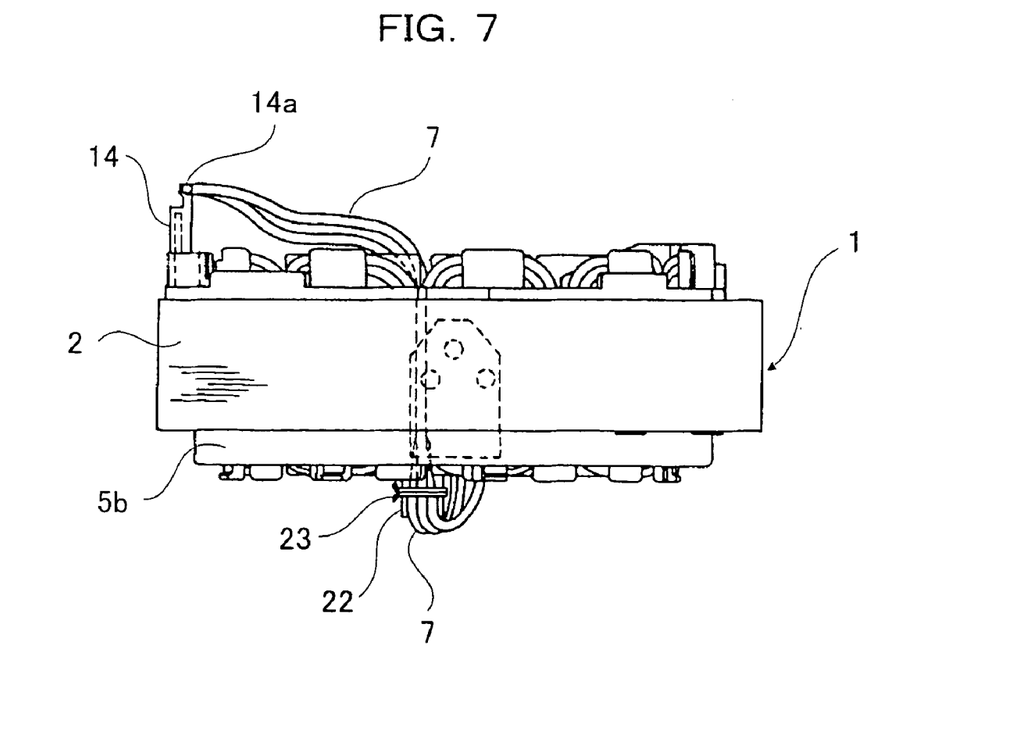
FIG. 7 is a side view of a stator of a motor according to (Embodiment 5) of the present invention.

FIG. 7 is a side view showing a stator of a motor according to (Embodiment 5) of the present invention.

FIG. 7 specifically shows a fixed state of a lead wire 7 which has been drawn to an insulating end plate 5*b* through 18*a*–*b* between adjacent teeth 18*a* and 18*b* as (Embodiment 3).

Reference numeral 22 denotes a pillar provided on the insulating end plate 5*b*. The pillar 22 and the lead wire 7 are fixed by a string 23, so that the vibration of the lead wire 7 does not propagate through a caulked portion 14*a* of a flag type terminal 14 during the operation of the motor, thereby preventing a break caused by a fatigue failure of the lead wire 7 on the caulked portion 14*a*.

When the pillar 20 is provided also on the insulating end plate 5*a* as (Embodiment 4), the lead wire 7 is fixed on the pillar 20, and the lead wire 7 is fixed to the pillar 22 through 18*a*–*b* between the teeth 18*a* and 18*b*, it is possible to more positively prevent a break caused by a fatigue failure.

(Embodiment 6)

The following explanation will be made in accordance with FIGS. 8 to 10.

Figure 8:
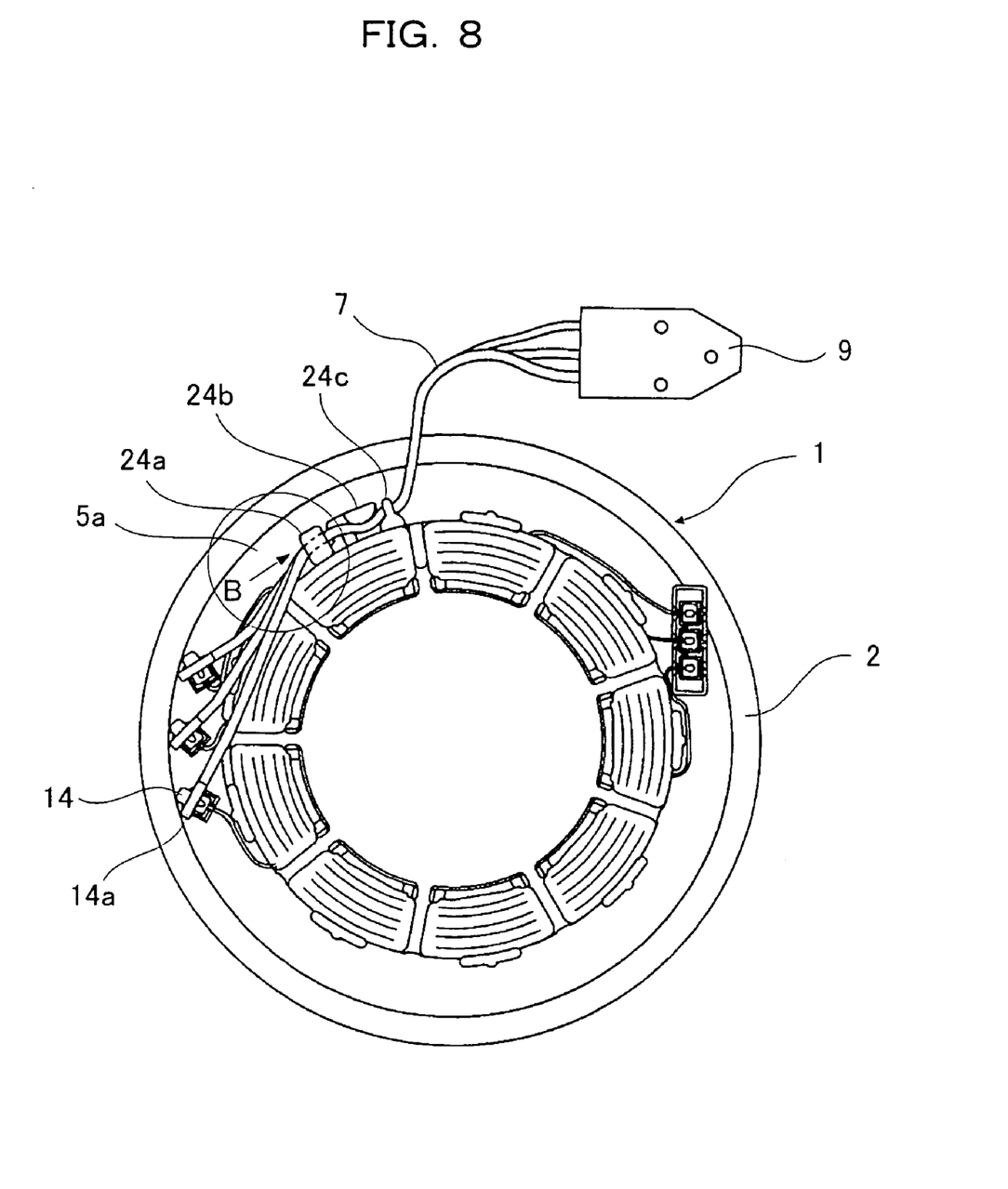
FIG. 8 is a front view of a stator of a motor according to (Embodiment 6) of the present invention.
Figure 9:
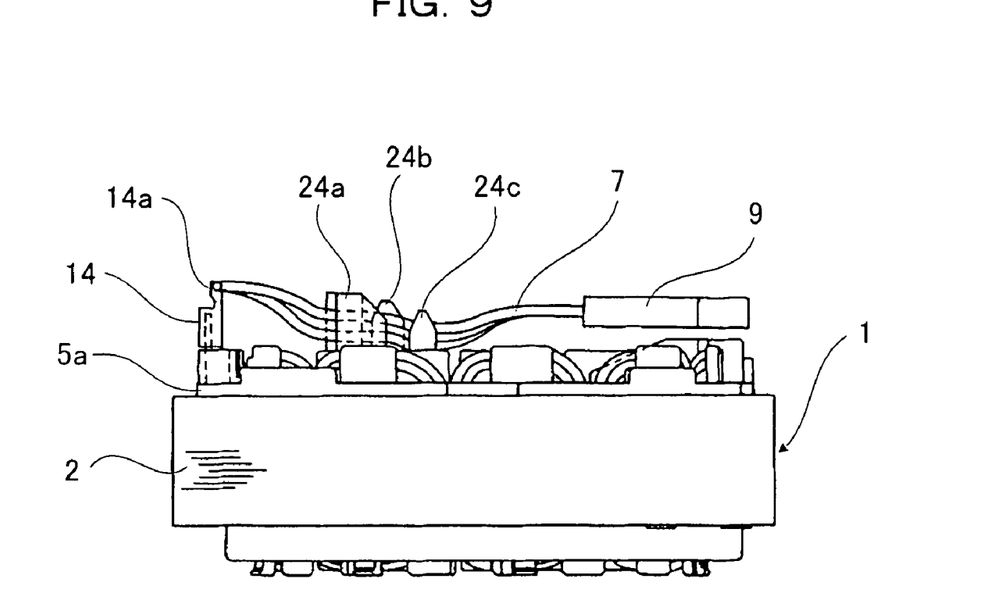
FIG. 9 is a side view of the stator of (Embodiment 6)

FIG. 8 is a front view showing a stator of a motor according to (Embodiment 6) of the present invention. FIG. 9 is a side view. FIG. 10 shows a main part of FIG. 8 taken in direction B.

The lead wire 7 drawn at a midpoint by press-fitting a flag type terminal 14 to a power supply terminal 4 as (Embodiment 1) passes through a plurality of walls 24*a*, 24*b*, and 24*c* formed zigzag on an insulating end plate 5*a*. Thus, it is possible to fix the lead wire 7 without using a string. The vibration of the lead wire 7 does not propagate through a caulked portion. 14*a* of the flag type terminal 14 during the operation of the motor, thereby preventing a break caused by a fatigue failure of the lead wire 7 on the caulked portion 14*a*.

Figure 10:
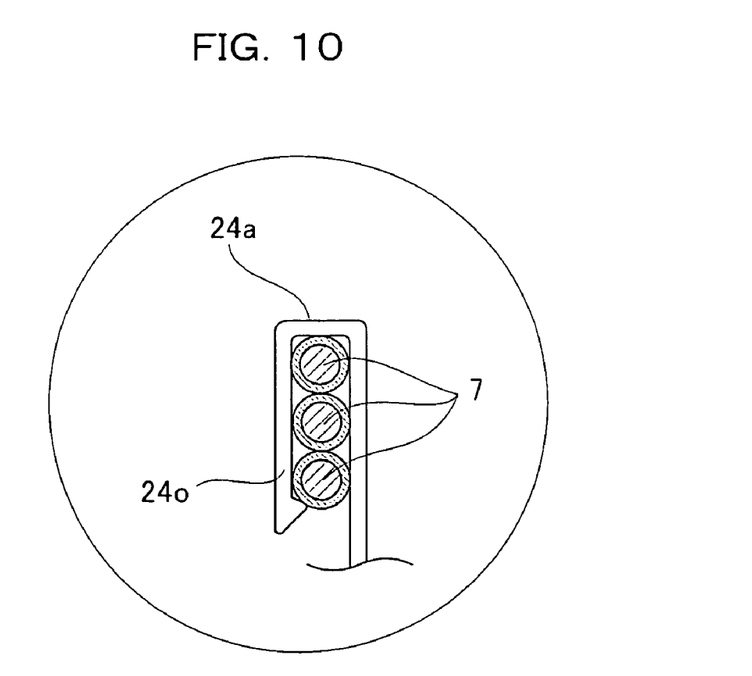
FIG. 10 is a fragmentary view of a main part of the stator as seen in the direction B in FIG. 8.

In this example, as shown in FIG. 10, the wall 24*a* has a hook 24*a* engaging the lead 7 formed on the outer periphery of a stator core 2.

(Embodiment 7)

The following explanation will be made in accordance with FIG. 11.

Figure 11:
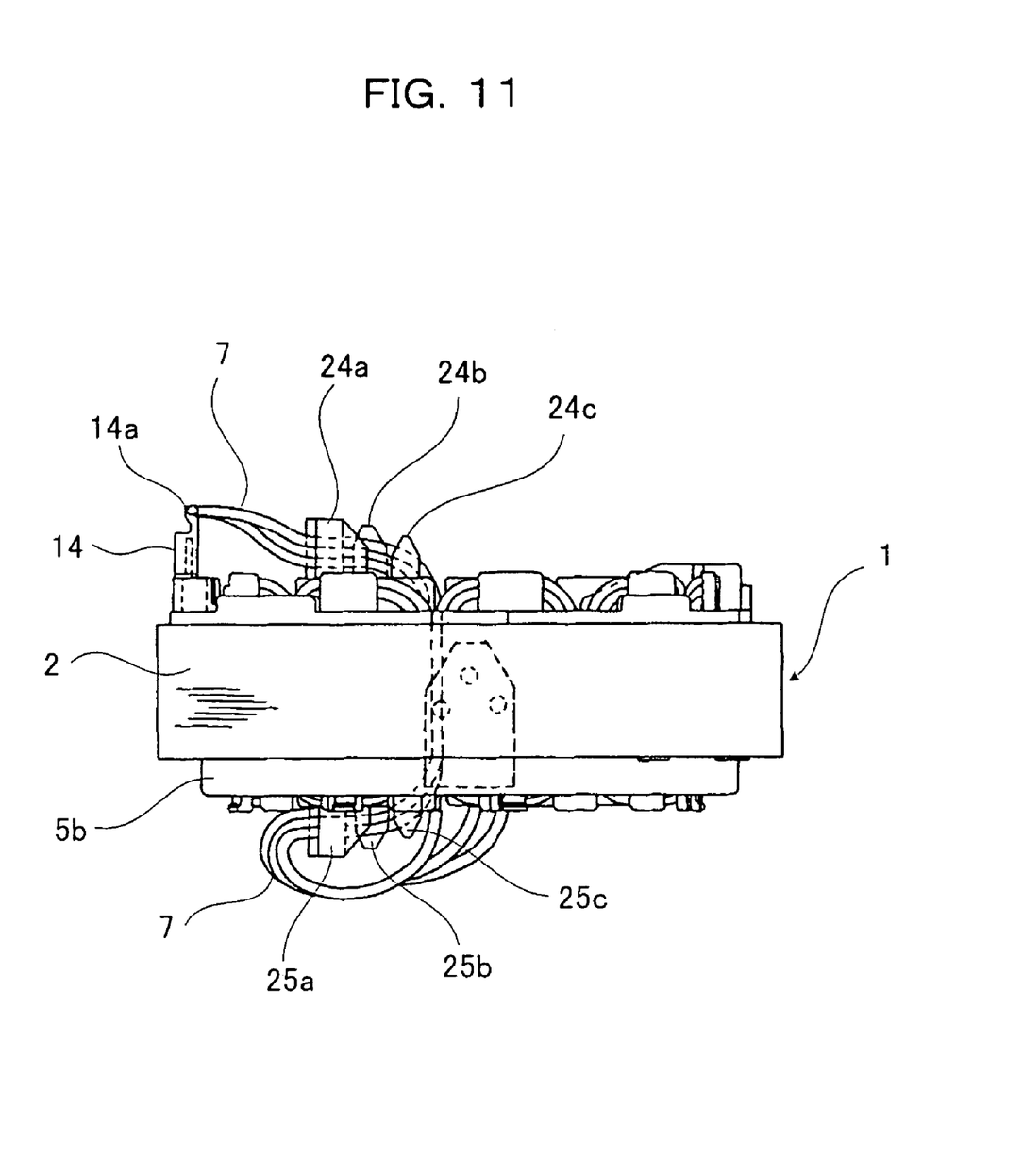
FIG. 11 is a side view of a stator of a motor according to (Embodiment 7) of the present invention.

FIG. 11 is a side view showing a stator of a motor according to (Embodiment 7) of the present invention.

This embodiment specifically shows a fixed state of a lead wire 7 which has been drawn to an insulating end plate 5*b* through 18*a*–*b* between adjacent teeth 18*a* and 18*b* as (Embodiment 5) after being drawn through a plurality of walls 24*a*, 24*b*, and 24*c* as (Embodiment 6).

The insulating end plate 5*b* has a plurality of walls 25*a*, 25*b*, and 25*c* similar to the walls 24*a*, 24*b*, and 24*c*. The lead wire 7 is drawn and fixed through the walls 25*a*, 25*b*, and 25*c*. With this configuration, the lead wire 7 can be fixed without using a string and the vibration of the lead wire 7 does not propagate through a caulked portion 14*a* of a flag type terminal 14 during the operation of the motor, thereby preventing a break caused by a fatigue failure of the lead wire 7 on the caulked portion 14*a*.

(Embodiment 8)

The following explanation will be made in accordance with FIGS. 12 and 13.

Figure 12:
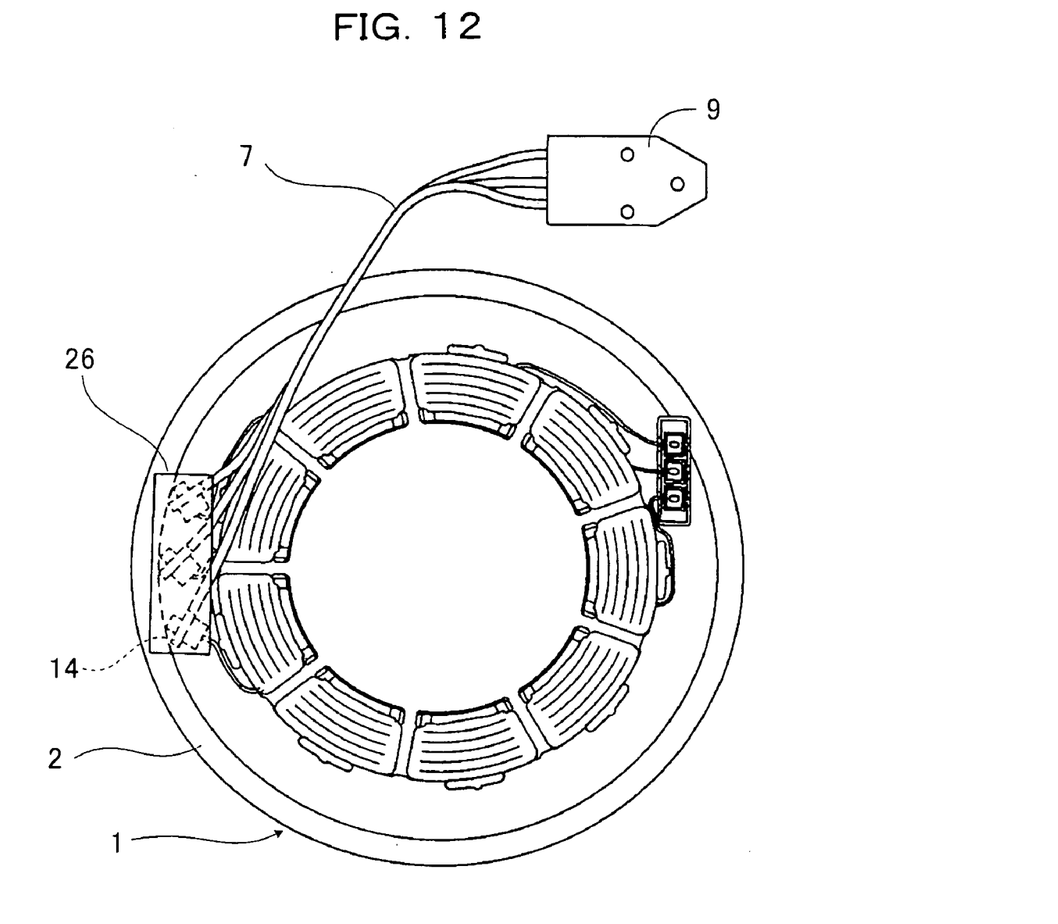
FIG. 12 is a front view of a stator of a motor according to (Embodiment 8) of the present invention.
Figure 13:
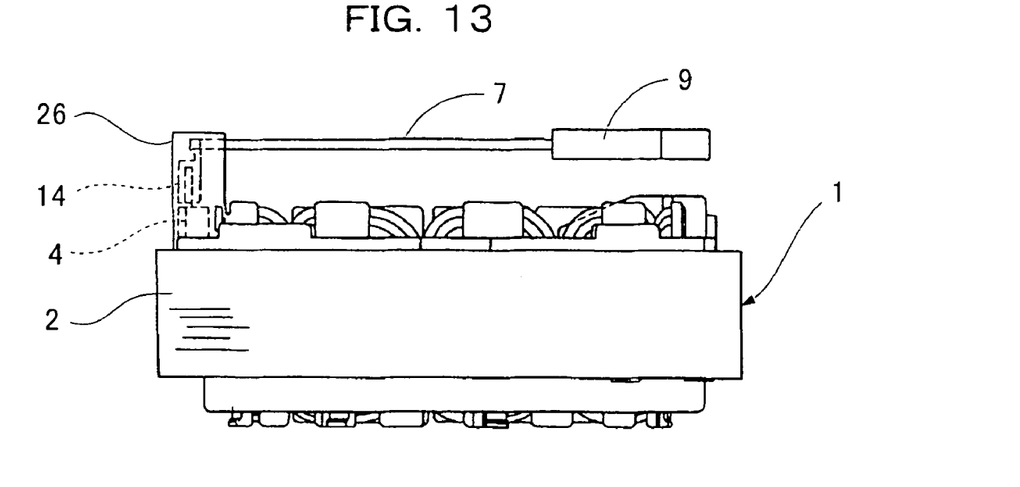
FIG. 13 is a side view of the stator of (Embodiment 8)

FIG. 12 is a front view showing a stator of a motor according to (Embodiment 8) of the present invention. FIG. 13 is a side view.

This embodiment is different from (Embodiment 1) in that joints of a plurality of power supply terminals 4 and flag type terminals 14 are covered with a power supply cover 26.

The power supply cover 26 is made of a nonconductive material, which can prevent an operator from receiving an electric shock during energization to confirm a normal operation of the motor after mounting the motor in a device. The power supply cover 26 makes it possible to prevent a short circuit on contact between the vicinity of the power supply terminal 4 and a conductive material such as a burr in the device when the motor is mounted in the device such as an electric compressor.

This configuration is similarly applicable in (Embodiment 2) to (Embodiment 7).

(Embodiment 9)

The following explanation will be made in accordance with FIGS. 14 and 15.

Figure 14:
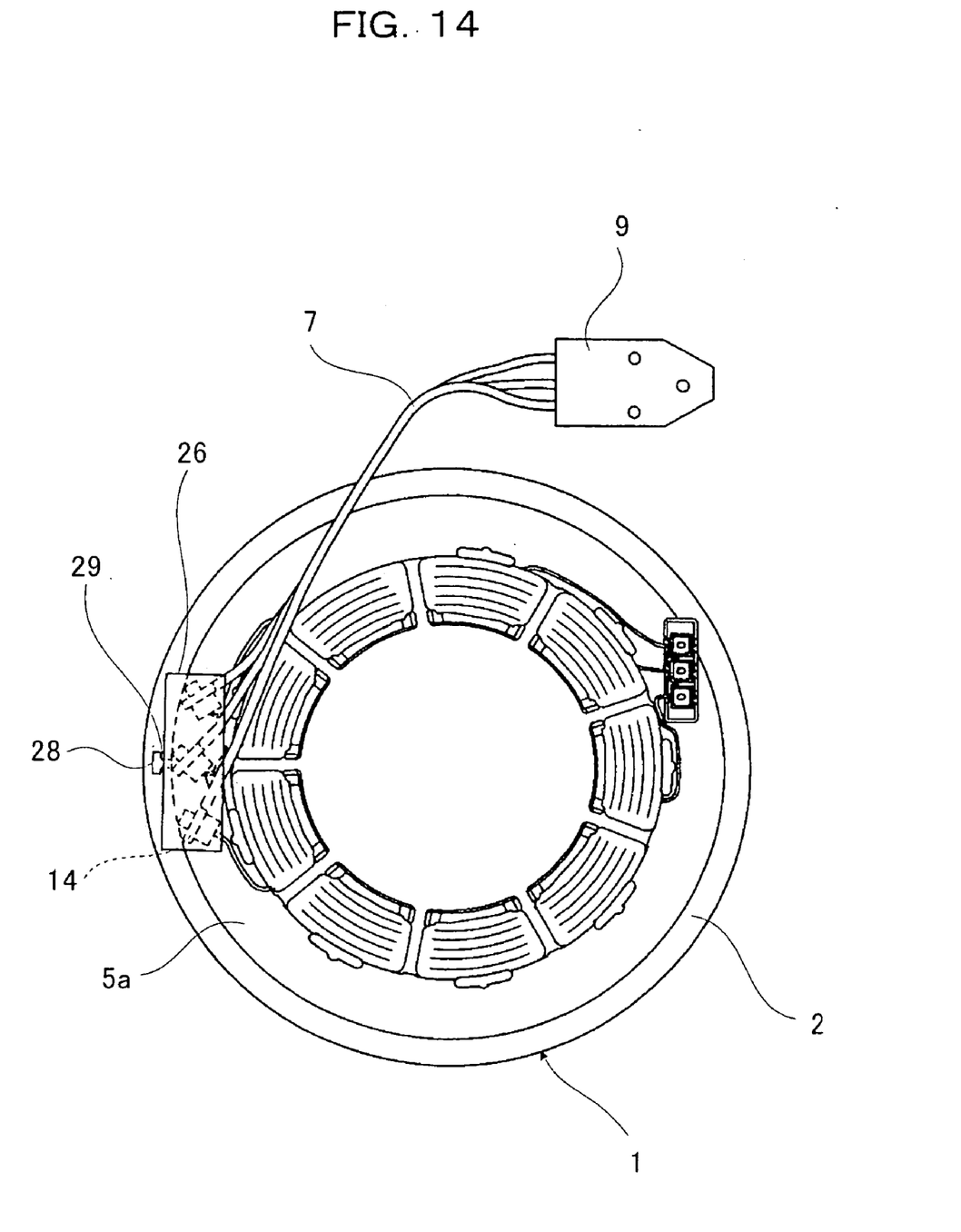
FIG. 14 is a front view of a stator of a motor according to (Embodiment 9) of the present invention.
Figure 15:
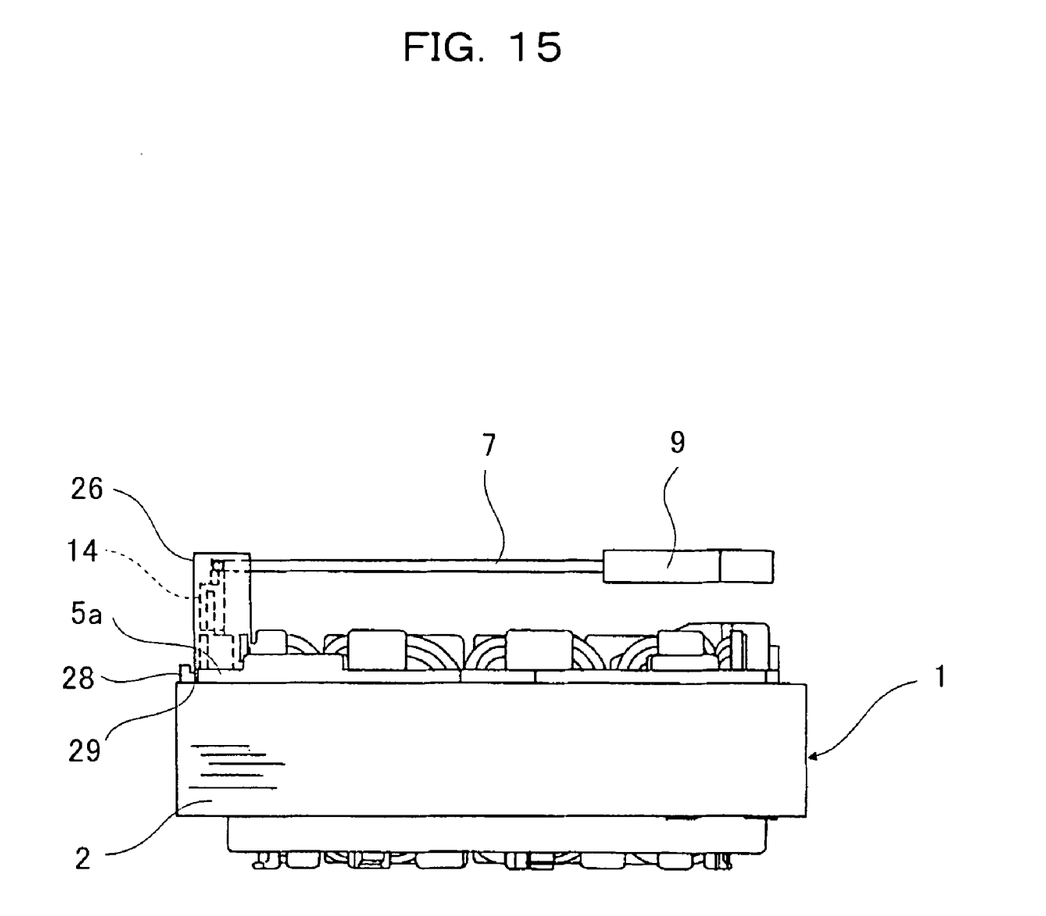
FIG. 15 is a side view of the stator of (Embodiment 9)

FIG. 14 is a front view showing a stator of a motor according to (Embodiment 9) of the present invention. FIG. 15 is a side view.

This embodiment is different from (Embodiment 8) in that a hole 29 is provided on the base end of a power supply cover 26 and a protrusion 28 is formed on a position corresponding to the hole 29 on an insulating end plate 5*a*.

By engaging the protrusion 28 in the hole 29 of the power supply cover 26, it is possible to prevent the power supply cover 26 from being disengaged by a vibration in the operation of the motor.

As described above, the motor of the present invention, comprising a stator having windings wound in a stator core and a rotor rotationally supported so as to face the internal cylindrical surface of the stator core, wherein the stator is configured so that a plurality of power supply terminals are provided, each having a tab of a planar protrusion on an end face of the stator core, the power supply side end of the winding is connected to the power supply terminal, and a lead wire with a flag type terminal is connected to the power supply terminal, the lead wire being connected to the flag type terminal in a direction intersecting a press-fitting direction into the tab, the plurality of power supply terminals are arranged at the same height from the end face of the stator core and are inclined such that the tab faces of the plurality of power supply terminals are not arranged on the same plane. Thus, it is possible to prevent the flag type terminal and the lead wire from interfering with each other in the vicinity of the power supply terminal and arrange the lead wire not higher than the flag type terminal from the stator core, thereby reducing the overall height of the stator.

Since the plurality of power supply terminals are arranged on the same circle, it is possible to arrange the plurality of power supply terminals while rotating the stator core with the central point of the circle serving as an axis, readily fabricate a facility where the power supply terminals are arranged, and introduce automation.

The lead wire is drawn from the end face where the power supply terminals are arranged to the opposite end face through adjacent teeth of a plurality of teeth which stretch toward the internal diameter cylindrical surface of the stator core in a radius direction. Thus, even when the lead wire has to be connected from the end face where the power supply terminals are arranged but it is difficult to connect the lead wire due to the presence of other components, the lead wire can be drawn from the end face opposite to the end face where the power supply terminals are arranged and the lead wire can be connected to the power supply.

A first insulating end plate and a second insulating end plate for insulating the stator core and the windings are disposed on both end faces of the stator core, and power supply terminal holding portions for holding the power supply terminals are provided on the first insulating end plate, so that the position of the power supply terminal holding portion can be fixed with ease by fixing the insulating end plate to the stator core.

Since the first insulating end plate has a pillar and the lead wire is fixed on the pillar, the vibration of the lead wire due to a vibration in the operation of the motor does not propagate through the flag type terminal, thereby preventing a break caused by a fatigue failure of the lead wire.

Since the second insulating end plate has a pillar and the lead wire is fixed on the pillar, the vibration of the lead wire due to a vibration in the operation of the motor does not propagate through the flag type terminal, thereby preventing a break caused by a fatigue failure of the lead wire.

Since the first insulating end plate has a plurality of walls arranged zigzag and the lead wire is fixed through the walls, the vibration of the lead wire due to a vibration in the operation of the motor does not propagate through the flag type terminal, thereby preventing a break caused by a fatigue failure of the lead wire.

Since the second insulating end plate has a plurality of walls arranged zigzag and the lead wire is fixed through the walls, the vibration of the lead wire due to a vibration in the operation of the motor does not propagate through the flag type terminal, thereby preventing a break caused by a fatigue failure of the lead wire.

A power supply cover is provided which is made of a nonconductive material and covers the flag type terminal, thereby preventing an operator from receiving an electric shock during energization to confirm a normal operation of the motor after mounting the motor in a device.

The first insulating end plate has a protrusion for holding the power supply cover and the power supply cover has a hole for engagement to the protrusion, thereby preventing the power supply cover from being disengaged by a vibration of the motor.

The windings are concentrated windings which are wound around the teeth stretched toward the internal diameter cylindrical surface of the stator core in the radius direction, thereby reducing the overall height of the stator including the windings as well as the power supply.

The invention claimed is:

1. A motor, comprising:
   a stator having a cylindrical stator core comprising a circular arrangement of teeth, and a winding wound around each of said teeth; and
   a rotor rotationally supported to face an internal cylindrical surface of the stator core, wherein
   said stator also comprises a plurality of power supply terminals each comprising a planar tab protruding from an end face of the stator core, an end of the winding adjacent a power supply is connected to the power supply terminal, and a lead wire having a flag type terminal attached thereto is connected to the power supply terminal, wherein each of the plurality of power supply terminals is arranged at the same height from the end face of the stator core and inclined so that faces of the tabs are not on the same plane, and wherein the lead wire extends from the end face having the power supply terminals, between two adjacent teeth in the stator core, to an opposite end face of the stator core.

2. The motor according to claim 1, wherein the plurality of power supply terminals are arranged on the same circle.

3. The motor according to claim 1, wherein a first insulating end plate and a second insulating end plate for insulating the stator core and the winding are located on both end faces of the stator core, and a power supply terminal holding portion for holding the power supply terminal is located on the first insulating end plate.

4. The motor according to claim 3, wherein the first insulating end plate has a plurality of walls arranged in a zigzag pattern and the lead wire extends through the walls.

5. The motor according to claim 3, wherein the second insulating end plate has a plurality of walls arranged in a zigzag pattern and the lead wire extends through the walls.

6. The motor according to claim 1, further comprising a power supply cover comprising a nonconductive material for covering the flag type terminal.

7. The motor according to claim 6, wherein the first insulating end plate has a protrusion for holding the power supply cover and the power supply cover has a hole for engaging with the protrusion.

8. The motor according to claim 1, wherein the winding is a concentrated winding wound around each tooth in said circular arrangement of teeth, each of said teeth extending toward the internal cylindrical surface of the stator core in a radial direction.

* * * * *